Figure 1:
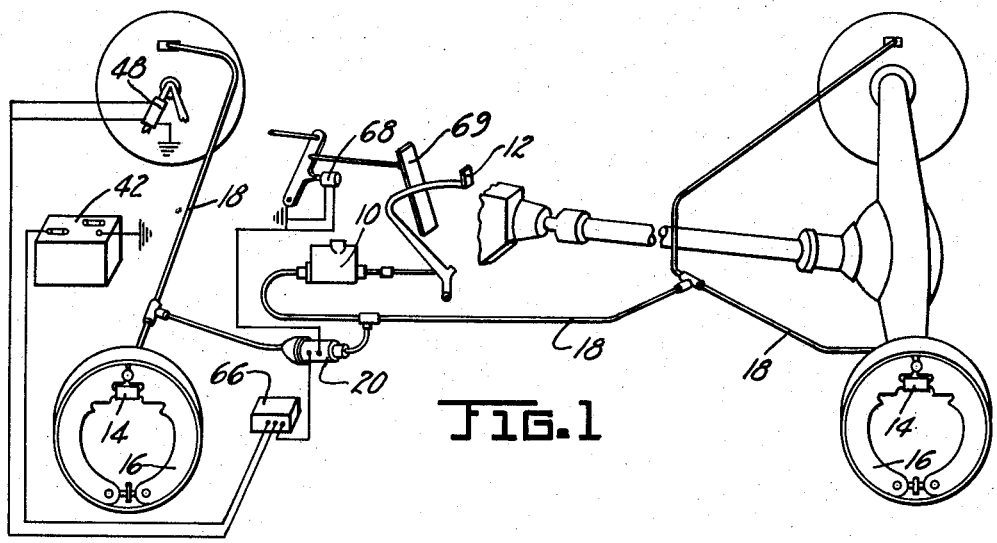

March 3, 1959

E. E. PRATHER 2,875,863

VEHICLE ANTI-CREEP MECHANISM INCLUDING
MOTION RESPONSIVE SWITCH

Filed March 1, 1954

INVENTOR.
EDWIN E. PRATHER
BY H. O. Clayton
ATTORNEY

United States Patent Office 2,875,863
Patented Mar. 3, 1959

2,875,863

VEHICLE ANTI-CREEP MECHANISM INCLUDING MOTION RESPONSIVE SWITCH

Edwin E. Prather, South Bend, Ind., assignor to Bendix Aviation Corporation, South Bend, Ind., a corporation of Delaware Application March 1, 1954, Serial No. 413,042

7 Claims. (Cl. 188—152)

This invention relates in general to switch controlling means and more particularly to power operated means for timing the operation of a switch.

In certain arts, for example, any one of the automotive brake control arts or the stamping press arts, it is desirable to control the time of operation of a brake mechanism in its operation of either maintaining a certain mass static after said mass is brought to a stop or its operation of bringing said mass to a stop in which case the brake mechanism is applied while the mass is still in motion. It is accordingly an object of my invention to effect this end and this may be done by the provision of a simple, compact and easily serviced switch controlling electrical means which may include a relay, said switch being included as a part of the relay and a part of the means being controlled, i. e., and anti-creep mechanism of the brake system of an automotive vehicle. With this adaptation of my invention there is provided means insuring an operation of the anti-creep mechanism either before or after the vehicle comes to a stop depending upon the adjustment of the mechanism.

Another object of my invention is to improve upon the governor controlled switch mechanisms of the day. Such mechanisms, i. e., the cubicle fly ball governor type of mechanism, are costly and have proven ineffective in operation when the same are used to control parts of the power plant of an automotive vehicle. Particularly is this true when this type of governor switch mechanism is called upon as a control at low vehicle speeds or to function after the vehicle is brought to a stop. However, with my invention the switch of the control mechanism is certain of operation either at the beginning of a certain period of time before the vehicle is stopped or at the end of a certain period of time after the vehicle is brought to a stop, the particular operation depending upon the adjustment of the mechanism.

Yet another object of my invention is to provide a switch controlling mechanism controlled by an inertia operated ball type switch, such that the switch to be controlled may be operated either before the inertia operated switch ceases to operate or at a certain time after said switch ceases to operate.

A further object of my invention is to provide, in an automotive vehicle including a four-wheel brake mechanism, brake anti-creep means, including a valve or its equivalent, for controlling the operation of two of the wheel brakes of the mechanism preferably the two front brakes; together with means, responsive to the kinetic energy of a certain part of the vehicle, for controlling said valve.

A further object of my invention is to provide, in a mechanism having a prime mover for placing all or certain parts of the mechanism in motion, a brake structure for bringing all or certain parts of said mechanism to a stop, said brake structure including switch means operative in accordance with the kinetic energy of certain parts of the mechanism, said switch means being unaffected in its operation by the operation of the prime mover.

A further object of my invention is to provide, in combination with a part of the unsprung portion of an automotive vehicle such as the A frame thereof, an inertia operated switch mounted on said frame, said switch serving as part of the brake anti-creep mechanism of the vehicle.

Yet another object of my invention is to provide a simple and compact inertia operated switch mechanism adapted for use in the controls of an automotive vehicle.

The above and other objects and features of the invention will appear more fully hereinafter from a consideration of the following description taken in connection with the accompanying drawings where one embodiment of the invention is illustrated by way of example.

Figure 2:
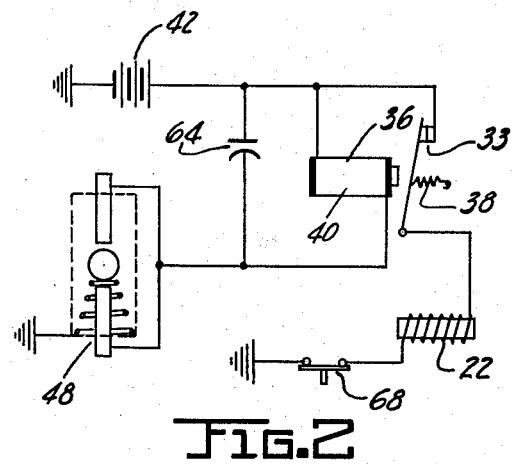
Figure 3:
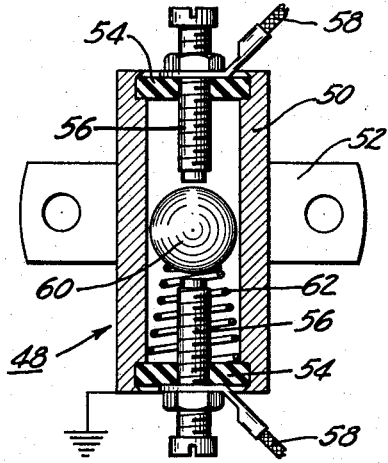
Figure 4:
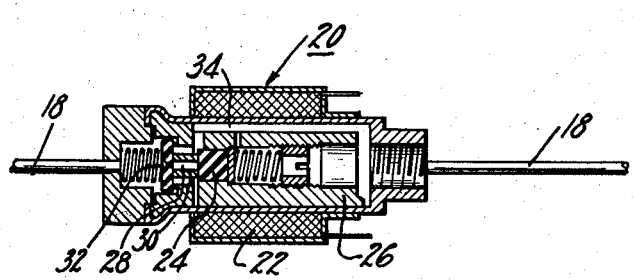

Figure 1 is a diagrammatic view disclosing one embodiment of my invention employed as a part of the anti-creep mechanism of an automotive vehicle;

Figure 2 discloses the electrical hookup of the mechanism of Figure 1;

Figure 3 is a sectional view disclosing details of the vibrator switch mechanism of my invention; and Figure 4 is a sectional view disclosing details of the solenoid operated check valve of the mechanism of Figure 1.

There is disclosed in Figures 1 and 2 a preferred embodiment of my invention wherein my switch controlling mechanism is employed to control a well known type of brake mechanism of an automotive vehicle, said mechanism including the anti-creep mechanism of my invention. This brake and anti-creep mechanism includes a master cylinder 10 housing a piston, not shown, which is actuated as a result of the manual operation of a brake pedal 12. Depression of the brake pedal to apply the brakes energizes wheel cylinders 14 which in turn actuate the brake shoes 16 of the wheel brakes of the vehicle. In this operation an incompressible or substantially incompressible brake fluid flows through conduits 18 and upon release of the brake pedal a certain mechanism including return springs, not shown, operates to return the parts of the mechanism to their brake off positions.

Briefly describing the anti-creep mechanism of this brake mechanism a solenoid operated check valve 20, Figure 4, preferably inserted in the system to control the front brakes of the vehicle, operates, with a release of the brake pedal and after the energization of a grounded solenoid 22, to trap the brake fluid between the wheel cylinders and said valve, thereby holding the brakes in their applied position; however, said solenoid when de-energized serves to disable this valve and thereby disable the anti-creep mechanism. Describing the latter operation a spring loaded yieldable member 24, Figure 4, housed within the armature 26 of the solenoid, is, with the solenoid de-energized, spaced from an opening 28 in the pole piece 30 of the solenoid thereby making it possible for the brake fluid to return through an opening 32 in the check valve, the opening 28, and thence through a recess 34 in the armature 26 and on toward the master cylinder 10. Figure 4 of the drawings discloses the solenoid 22 energized thereby rendering the anti-creep mechanism operative.

In certain cars of the day the solenoid 22 is energized and deenergized, to operate the anti-creep portion of the brake mechanism, with an operation of a vehicle speed responsive governor operated switch; however, as stated above this governor is somewhat uncertain in operation particularly as to its time of operation. Accordingly, it is an object of my invention to provide an efficient and effective means for controlling the time of operation of a switch mechanism and said control means may, as disclosed in Figures 2 and 3, be substituted for the aforementioned vehicle speed responsive governor operated control switch of the anti-creep mechanism of the day.

Describing now the switch control means of Figures 1 and 2 there is provided a normally closed switch 33 of a relay 36; and this switch is preferably biased to its closed position by a spring 38. The coil 40 of the relay is electrically connected in series with a grounded battery 42, and a grounded ball type inertia breaker switch 48 which is opened just before the car is brought to a stop; and said switch is open when the car is at a stop. The latter switch constitutes the most important feature of my invention and is disclosed in detail in Figure 3.

As disclosed in Figure 3 the inertia switch 48, which is preferably mounted on an unsprung portion of the vehicle, preferably the A-frame thereof, includes an electrically grounded tubular metal casing 50 secured to said frame by a bracket member 52 fixedly connected to the casing. The ends of the tube are closed by insulating mats 54 each having an opening in its central portion to adjustably receive electrical contact screws 56. The screws, which are conductors of electricity, have electrical conductor wires 58 secured thereto. The screws are spaced from each other at the center of the tube and a metallic, electrically conductive ball 60, supported by a spring 62 in tight contact with the tube, is positioned in this space. When the vehicle is at a standstill the ball 60 is spaced from the ends of the screws 56, all as disclosed in Figures 2 and 3.

As to the operation of the switch 48 when the vehicle is traveling say at a speed of over one mile per hour the movement, including the up and down movement, of the contact screws 56 is such that the switch is closed. Describing this operation the ball 60, by virtue of its inertia, tends to remain at rest accordingly when the casing 50 and the contact screws 56 secured thereto are sufficiently accelerated either up or down, the ball will come into contact with one or the other of said screws thereby closing the switch. In this operation it is to be remembered that the metallic casing 50 is electrically grounded and that the spring 62 and insulated screws 56 are conductors of electricity. It is to be particularly noted that the switch 48 is so constructed and so mounted on the vehicle that the same is not closed by the vibration caused by the idling engine that is prime mover of the vehicle, the latter being then at a standstill.

One feature of my invention lies in the provision of a condenser 64, Figure 2, which is electrically connected in parallel with the relay coil 40 in the aforementioned electrical circuit including the battery 42 and the inertia breaker switch 48. The relay 36 and condenser 64 may be housed within one container indicated by the reference numeral 66 in Figure 1.

The parts of the mechanism of Figure 1, particularly the switch 48 and the condenser 64 and the charging rate thereof, are preferably so constructed and arranged and so operative that the anti-creep mechanism is rendered operative at the beginning of a certain period of time before the vehicle comes to a stop, say when the vehicle is traveling at the rate of one mile per hour; or the parts of the mechanism may be constructed and arranged and operative to effect an operation of the anti-creep mechanism at the end of a certain period of time after the vehicle comes to a stop. An inspection of the electrical hookup of Figure 2 and an inspection of the switch mechanism 48 of Figure 3 reveals the operation of the mechanism to effect either one of these results inasmuch as the condenser 64 is electrically connected in parallel with the relay coil 40. It is to be particularly noted that the time of operation, that is time of opening of the switch 48, is controlled in large measure by the vibration of the vehicle as a means for effecting the operation of said switch. With normal driving on the roads of the day the switch 48 will be opened when the car is traveling over one mile per hour.

As to the remainder of the electrical circuit for controlling the operation of the solenoid 22 of the anti-creep mechanism, said circuit includes, in series with the solenoid, the normally closed relay switch 33, an accelerator operated breaker switch 68, and the grounded battery 42. The accelerator operated breaker switch 68 is not disclosed in detail inasmuch as no claim is made thereto the same being of any of the well known designs of such a switch. This switch 68 is closed only when the accelerator is in its released position the latter being indicated by the reference numeral 69.

Describing now in brief the operation of the embodiment of my invention disclosed in the figures of the drawing the anti-creep mechanism is rendered inoperative so long as the car is traveling at a speed of above say one mile per hour; this for the reason that the relay switch 33 is then held open by a closure operation of the inertia switch 48 and the operation of the condenser 64, thereby rendering the check valve 20 inoperative to trap the brake fluid in the slave cylinders. However, at the end of a certain period of time after the car reaches the aforementioned reduced speed, that is the time period in micro seconds during which the condenser 64 is in its process of discharging, the switch 33 is automatically closed by operation of the spring 38 thereby effecting an energization of the solenoid 22 to render the anti-creep mechanism operative. It is repeated, however, that the mechanism of Figures 1, 2, and 3 may be adjusted to effect the initiation of the operation of the anti-creep mechanism at the beginning of a certain period of time after the car comes to a stop.

The time of operation of the anti-creep mechanism with respect to movement of the vehicle, that is the determination of whether or not the anti-creep mechanism comes into play before or after the car comes to a stop and when this operation is effected, may be controlled by a determination of any one or a plurality of many factors including the capacity of the condenser 64, the air gap of the relay, the resistance of the relay coil, the strength of the relay spring 38, and the speed of operation of the breaker switch 48.

The relay switch 33, that is the switch which is controlled, may also be employed to control the closure of the doors of an automotive bus and to control the operation of a transmission operating mechanism of an automotive vehicle to effect say a low gear setting of said mechanism; and to effect the latter operation of my invention the parts of the mechanism are preferably so constructed as to effect a closure of the said switch a short time prior to a stopping of the vehicle.

The switch control means of my invention also finds a place when used in an automotive vehicle including a fluid coupling combined with the above described hydraulic anti-creep brake mechanism; and my invention may also be incorporated in the brake mechanism of a stamping press wherein it is desirable to employ a small and inexpensive brake to maintain a relatively massive fly wheel or equivalent part of the press mechanism static. With the mechanism of my invention the brake may be applied and held applied to the prime mover driven fly wheel of the stamping press after and only after said fly wheel has come to a stop; or the parts may be constructed and adjusted so that the brake is applied and held applied just before the fly wheel comes to a stop.

I claim:

1. A motion sensing device for an automotive vehicle and the like having an unsprung mass, a sprung mass, and road contacting wheels supported from said unsprung mass, said device comprising a control element to be actuated above substantially predetermined speeds of said vehicle, an electrical solenoid for operating said control element, an electrical condenser in parallel electrical circuit with respect to said solenoid, a pair of abutments generally rigidly secured to the unsprung mass of said vehicle adjacent a road contacting wheel, one of said abutments being connected in electrical series circuit with said condenser and said solenoid, a metallic pole piece positioned between said abutments for rebounding between said abutments as a result of vibration, and means connecting said piece in electrical series energizing circuit with respect to said one of said abutments, and said pole piece normally being supported out of engagement with said one of said abutments, whereby vibration produced in said unsprung mass as a result of wheel movement over the road causes said pole piece to periodically charge said condenser and thereby actuate said solenoid to operate said control element at vehicle speeds above a generally predetermined rate.

2. A motion sensing device for an automotive vehicle and the like having an unsprung mass, a sprung mass, and road contacting wheels supported from said unsprung mass, said device comprising a control element to be actuated above substantially predetermined speeds of said vehicle, an electrical solenoid for operating said control element, an electrical condenser in parallel electrical circuit with respect to said solenoid, means supported by said unsprung mass defining sidewall portions of a generally longitudinally extending chamber, a pair of abutments axially spaced in said chamber a generally predetermined distance apart, one of said abutments being electrically conductive and being electrically insulated with respect to said sidewall portions, a pole piece contained within said chamber between said abutments and having clearance with respect thereto for rebounding between said abutments as a result of vibration, said one of said abutments forming one contact of a switch, said pole piece normally being supported out of engagement with said one of said abutments and said pole piece forming a second contact connected in electrical series circuit with respect to said one of said abutments to effect circuit closure when engaging said one of said abutments, and said contacts being in electrical series energizing circuit with respect to said condenser, whereby vibration produced in said unsprung mass as a result of wheel movement over the road causes said pole piece to periodically charge said condenser and thereby actuate said solenoid to operate said control element at vehicle speeds above a generally predetermined rate.

3. A motion sensing device for an automotive vehicle and the like having an unsprung mass, a sprung mass, and road contacting wheels supported from said unsprung mass, said device comprising a control element to be actuated above substantially predetermined speeds of said vehicle, an electrical solenoid for operating said control element, an electrical condenser in parallel electrical circuit with respect to said solenoid, means supported by said unsprung mass defining sidewall portions of a generally longitudinally extending chamber, a pair of abutments axially spaced in said chamber a generally predetermined distance apart, one of said abutments being electrically conductive and being electrically insulated with respect to said sidewall portions, a pole piece contained within said chamber between said abutments and having clearance with respect thereto for rebounding between said abutments, said one of said abutments forming one contact of a switch, spring means normally supporting said pole piece out of engagement with said one of said abutments, said pole piece being contacted by one of said means when in engagement with said one of said abutments, and said one of said abutments being in electrical series energizing circuit with respect to said condenser, whereby motion of said vehicle over the surface of the road causes said pole piece to periodically charge said condenser and thereby actuate said solenoid to operate said control element at vehicle speeds above a generally predetermined rate.

4. A no-creep system for an automotive vehicle having an unsprung mass, a sprung mass, road contacting wheels supported by said unsprung mass, and braking means for restraining rotation of the wheels, said system comprising, a fluid pressure motor for actuating said braking means, a master cylinder connected to said fluid pressure motor for actuating the same, a solenoid operated valve operatively positioned between said master cylinder and said fluid pressure motor to hold a predetermined pressure in said fluid pressure motor when its solenoid is energized, a normally closed switch in an electrical supply circuit for said solenoid of said valve, a second solenoid for opening said switch when electrical flow rates above a substantially predetermined value passes through said second solenoid, an electrical condenser in parallel electrical circuit with respect to said second solenoid, a generally vertical metallic tubular member mounted on said unsprung mass adjacent a road contacting wheel, a pair of metallic axially positioned abutment pins respect of one of which are rigidly positioned in respective ends of said tubular member and electrically insulated from said tubular member, means connecting said metallic pins and said tubular member in electrical series energizing circuit with said condenser, a metallic ball of a diameter less than the spacing of said abutment pins positioned in said tubular member between said abutment pins, and a coil spring positioned about and out of engagement with the lower abutment pin to normally support said ball out of engagement with said abutment pins, whereby vibration of said unsprung mass causes said ball to bounce back and forth between said abutment pins to periodically charge said condenser at a rate sufficient to operate said solenoid and at a vehicle speed above a generally predetermined vehicle rate.

5. A vibration control system for a machine having movable parts which cause vibration to be produced in a frame structure, said device comprising a control element constructed and arranged to control the movement of said movable parts, an electrical solenoid for operating said control element, an electrical condenser in parallel electrical circuit with respect to said solenoid, and a vibration sensitive electrical switch in series electrical energizing circuit with respect to said condenser and said solenoid, said switch being mounted upon the frame structure and comprising means substantially rigidly secured to said frame structure and defining sidewall portions of a generally longitudinally extending chamber, a pair of abutments axially spaced in said chamber a generally predetermined distance apart, one of said abutments, being electrically conductive and being electrically insulated with respect to said sidewall portions, a pole piece contained within said chamber between said abutments and having clearance with respect thereto for rebounding between said abutments as a result of vibration, said one of said abutments forming one contact of a switch, said pole piece normally being supported out of engagement with said one of said abutments, said pole piece forming a second contact connected in electrical series circuit with respect to said one of said abutments to effect closure when engaging said one of said abutments, and said contacts being in electrical series energizing circuit with respect to said condenser, whereby vibration in said frame structure above a generally predetermined level causes said pole piece to rebound between said abutments to operate said control element.

6. A vibration control system for a machine having movable parts which cause vibration to be produced in a frame structure, said device comprising a control element constructed and arranged to control the movement of said movable parts, an electrical solenoid for operating said control element, an electrical condenser in parallel electrical circuit with respect to said solenoid, and a vibration sensitive electrical switch attached to said frame structure, said switch comprising means substantially rigidly secured to said frame structure and defining sidewall portions of a generally longitudinally extending chamber, a pair of abutments axially spaced in said chamber a generally predetermined distance apart, one of said abutments being electrically conductive and being electrically insulated with respect to said sidewall portions, a pole piece contained within said chamber between said abutments and having clearance with respect thereto for rebounding between said abutments, said one of said abutments forming one contact of a switch, spring means normally supporting said pole piece out of engagement with said one of said abutments, said pole piece being contacted by one of said means when in engagement with said one of said abutments, and said one of said means and said one of said abutments being in electrical series energizing circuit with respect to said condenser, whereby vibration in said frame structure above a generally predetermined level causes said pole piece to rebound between said abutments to operate said control element.

7. A vibration control system for a machine having movable parts which cause vibration to be produced in a frame structure, said device comprising a control element constructed and arranged to control the movement of said movable parts, an electrical solenoid for operating said control element, an electrical condenser in parallel electrical circuit with respect to said solenoid, and a vibration sensitive electrical switch attached to said frame structure, said switch comprising a generally vertical metallic tubular member generally rigidly secured to said frame and having an inner longitudinally extending chamber, a pair of metallic axially positioned abutment pins respective ones of which are rigidly positioned in respective ends of said chamber and are electrically insulated from said tubular member, means connecting said metallic pins and said tubular member in electrical series energizing circuit with said condenser, a metallic ball of a diameter less than the spacing of said abutment pins positioned in said chamber between said abutment pins, and a coil spring positioned about and out of engagement with the lower abutment pin and normally supporting said ball out of engagement with said abutment pins, whereby vibration of said frame structure above a generally predetermined intensity bounces said ball back and forth between said abutment pins to periodically charge said condenser at a rate sufficient to operate said solenoid.

References Cited in the file of this patent

UNITED STATES PATENTS

| | | |
|---|---|---|
| 1,149,042 | Goldstein | Aug. 3, 1915 |
| 1,872,068 | Brown | Aug. 16, 1932 |
| 2,121,651 | Claytor | June 21, 1938 |
| 2,262,842 | Goepfrich | Nov. 18, 1941 |
| 2,383,889 | Rice | Aug. 28, 1945 |
| 2,391,129 | Chambers | Dec. 18, 1945 |
| 2,415,086 | Detwiler | Feb. 4, 1947 |
| 2,574,821 | Forman | Nov. 13, 1951 |
| 2,642,484 | Price | June 16, 1953 |
| 2,678,430 | Loescher | May 11, 1954 |

OTHER REFERENCES

S. A. E. Journal, June 1928, vol. XXII, No. 6, page 636 relied on.